United States Patent
Ridge et al.

(10) Patent No.: US 7,756,206 B2
(45) Date of Patent: Jul. 13, 2010

(54) FGS IDENTIFICATION IN SCALABLE VIDEO CODING

(75) Inventors: Justin Ridge, Irving, TX (US); Ye-Kui Wang, Tampere (FI); Yiliang Bao, Irving, TX (US); Marta Karczewicz, Irving, TX (US); Xianglin Wang, Irving, TX (US)

(73) Assignee: Nokia Corporation, Espoo (FI)

( * ) Notice: Subject to any disclaimer, the term of this patent is extended or adjusted under 35 U.S.C. 154(b) by 1460 days.

(21) Appl. No.: 11/105,312

(22) Filed: Apr. 13, 2005

(65) Prior Publication Data

US 2006/0233241 A1 Oct. 19, 2006

(51) Int. Cl.
*H04N 7/12* (2006.01)
(52) U.S. Cl. ............ 375/240.25; 375/240; 375/240.01; 375/240.08
(58) Field of Classification Search .................. 375/240, 375/240.01, 240.08, 240.25
See application file for complete search history.

(56) References Cited

U.S. PATENT DOCUMENTS 7,116,717 B1 * 10/2006 Eshet et al. ............ 375/240.25
2006/0029133 A1 * 2/2006 Chen ..................... 375/240.08

FOREIGN PATENT DOCUMENTS

CN 1515118 7/2004

OTHER PUBLICATIONS

Working Draft 1.0 of 14496-10:200x/AMD1 Scalable Video Coding, Joint Video Team (JVT) of ISO/IEC MPEG & ITU-T VCEG, Julien Reichel etl al., Jan. 2005, pp. 1-82.

* cited by examiner

*Primary Examiner*—Allen Wong
(74) *Attorney, Agent, or Firm*—Foley & Lardner, LLP

(57) ABSTRACT

A system and method for providing improved FGS identification in scalable video coding. According to the present invention, each FGS enhancement layer is assigned a unique dependency identifier and contains only FGS enhancement information. For subsequent enhancement layers, the base dependency identifier for the subsequent enhancement layers will point to either a base-quality layer or an FGS enhancement layer.

7 Claims, 5 Drawing Sheets

FGS IDENTIFICATION IN SCALABLE VIDEO CODING

FIELD OF THE INVENTION

The present invention relates generally to video coding. More particularly, the present invention relates to scalable video coding.

BACKGROUND OF THE INVENTION

Conventional video coding standards, such as the Moving Pictures Expert Group (MPEG)-1, H.261/263/264 standards, incorporate motion estimation and motion compensation in order to remove temporal redundancies between video frames. The scalable extension to the H.264/AVC (which stands for Advanced Video Coding) standard currently enables fine-grained scalability, according to which the quality of a video sequence may be improved by increasing the bit rate in increments of ten percent or less. Currently, fine granularity scalability (FGS) information is not considered to be a separate "layer," but instead is stored along with the "base layer" it is encoded relative to. However, when forming subsequent enhancement layers, it would be beneficial to have the option of basing the enhancement upon the base layer either with or without FGS.

Conventional systems, though moderately useful, include at least two substantial problems. First, scalability does not always follow a "linear" path. For example, it may be desirable to have a low spatial resolution base layer encoded at some minimal acceptable quality, with FGS used to enhance the quality. Furthermore, it may also be desirable to have a spatial enhancement encoded relative to the base layer (excluding FGS). This could be desired, for example, due to bit rate constraints on a transmission channel that does not permit the "expense" of transmitting the extra FGS data when only a spatial enhancement is desired.

In the currently-planned H.264/AVC scalability extension, the FGS information is not considered to be a separate layer. Consequently, there is no mechanism of specifying whether the spatial enhancement layer is encoded relative to the base layer with or without FGS. In other words, the operation must be "hard wired".

Second, the progressive enhancement/refinement slices (i.e., FGS slices) and the corresponding base layer picture are currently envisioned as being in the same picture and therefore the same access unit. These items also have the same value for the DependencyId. This architecture is less than optimal for system-layer operations. In the media file format, e.g., the AVC file format specified in ISO/IEC 14496-15, metadata information is typically stored for each sample containing a picture or an access unit. The above picture (access unit) definition therefore requires a streaming server to parse into samples, even for non-FGS scalable streaming (i.e. when truncation of FGS slices is not needed to reach the desired scalable presentation point). From this point of view, the current design enforces a media file format for storage of scalable video content with increased complexity, which implies streaming server operations with increased complexity.

SUMMARY OF THE INVENTION

The present invention involves coding FGS information in a separate layer to its corresponding base information. According to the present invention, each FGS enhancement layer is made into its own picture and is assigned a unique DependencyId value. In this sense, each FGS enhancement plane or layer is treated in the same manner as other enhancement layers, such as spatial enhancement layers. The base layer picture of the FGS enhancement layer is made into another picture with its own DependencyId value. Subsequent enhancement layers will be coded relative to either the quality base layer or an FGS enhancement layer. This system of the present invention provides an improved level of flexibility in scalable video coding while also possessing a low level of complexity.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
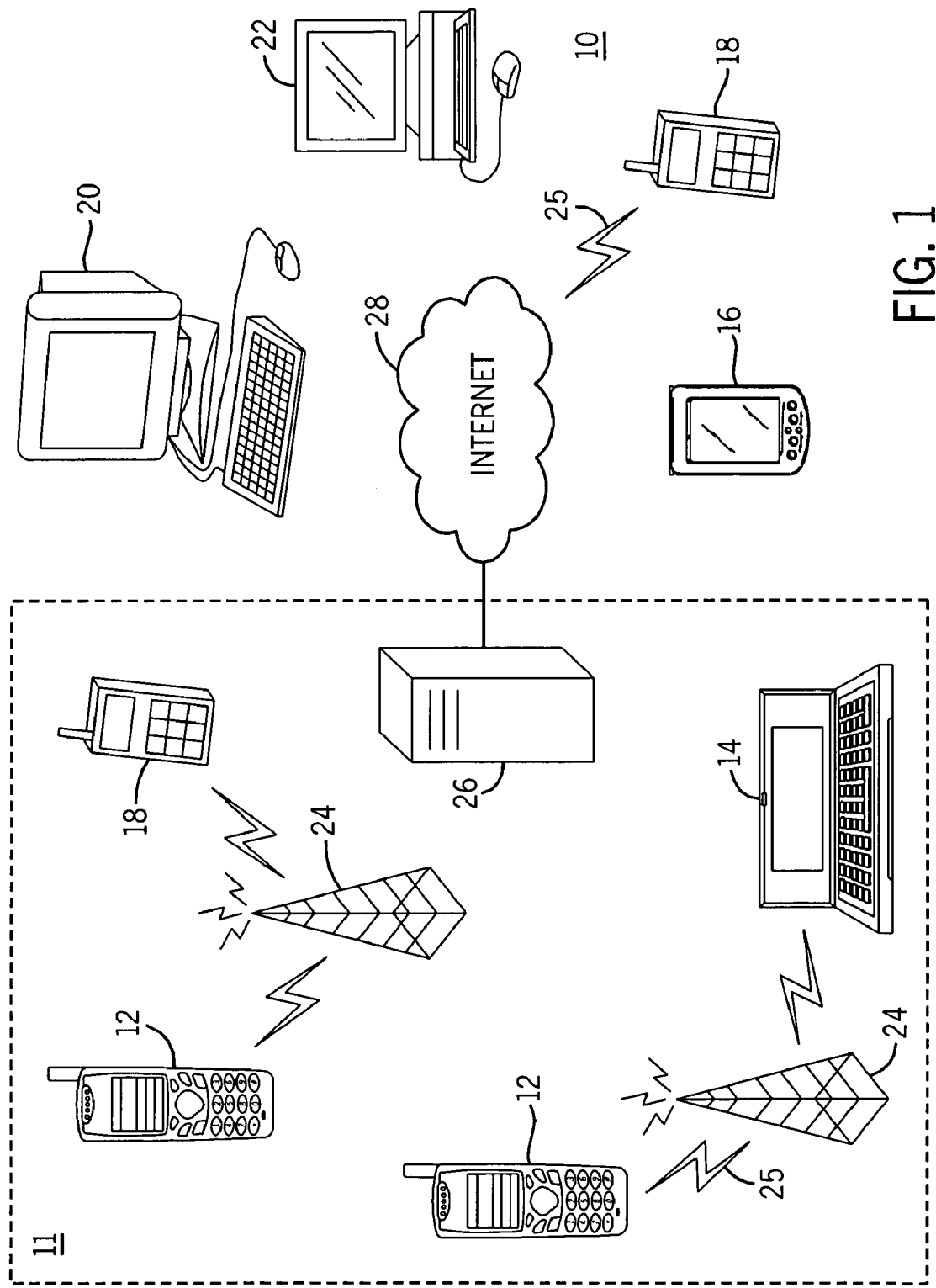
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28.

The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
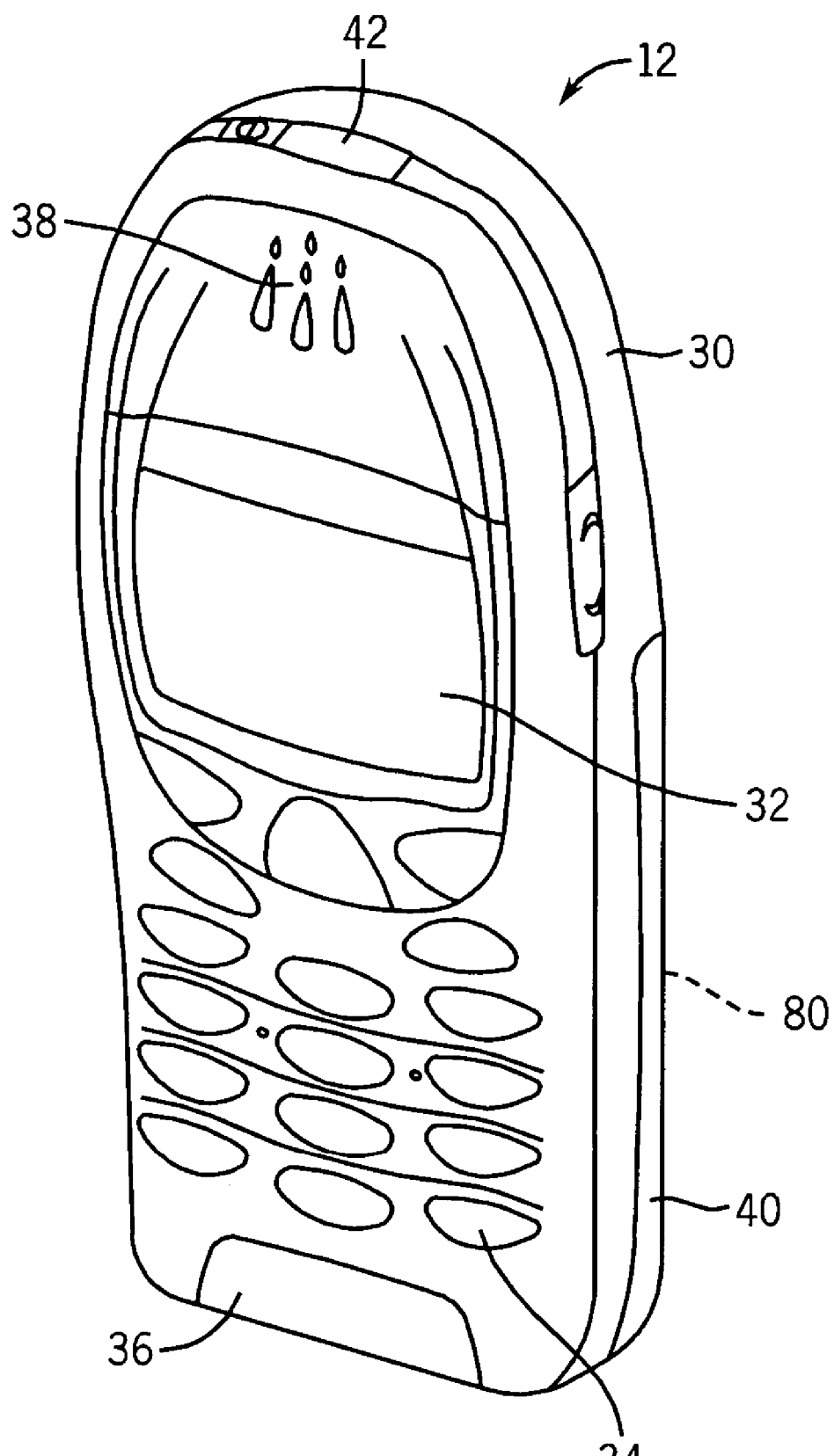
FIG. 2 is a perspective view of a mobile telephone that can be used in the implementation of the present invention.
Figure 3:
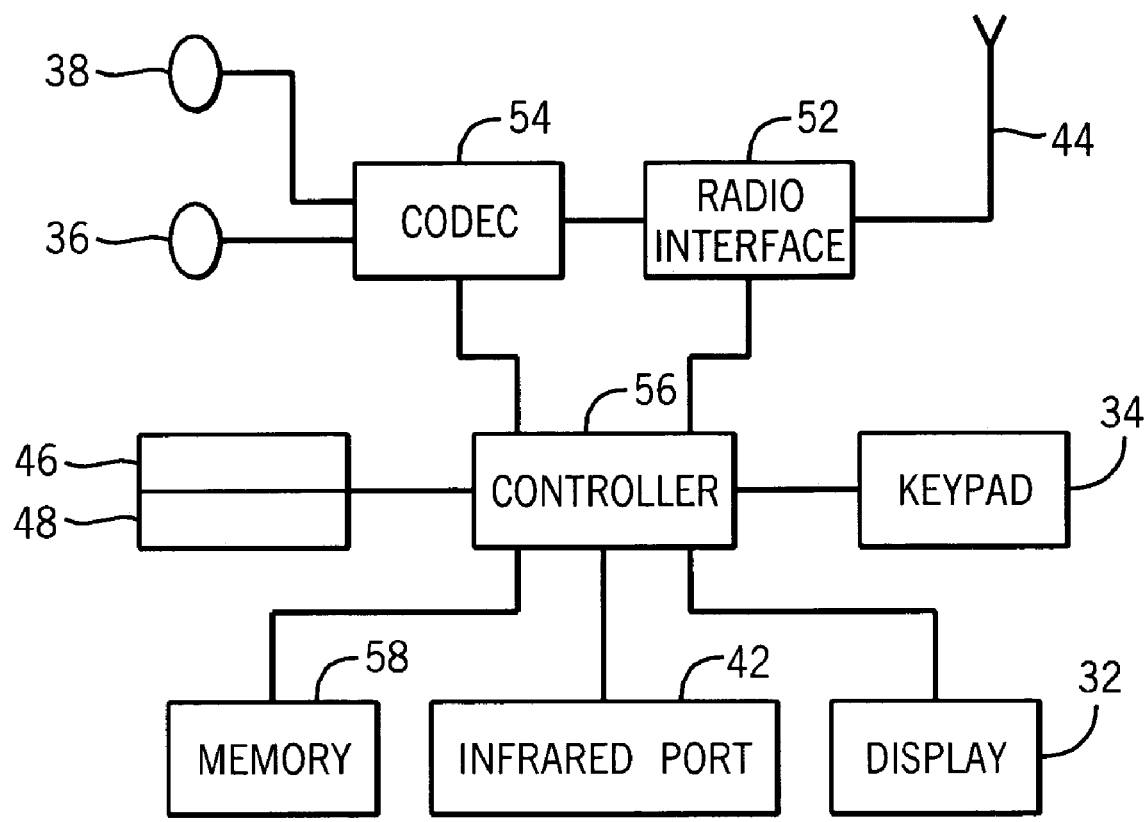
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention involves the removal of the quality level information from the decodability_dependency_information. Instead, the present invention assigns a distinct DependencyId value to each FGS enhancement layer. Therefore, whenever an enhancement layer specifies the DependencyId value of the base layer on which it depends, either a base-quality layer or any FGS enhancement to that base-quality layer can be specified, as each has a unique value of DependencyId.

Figure 5:
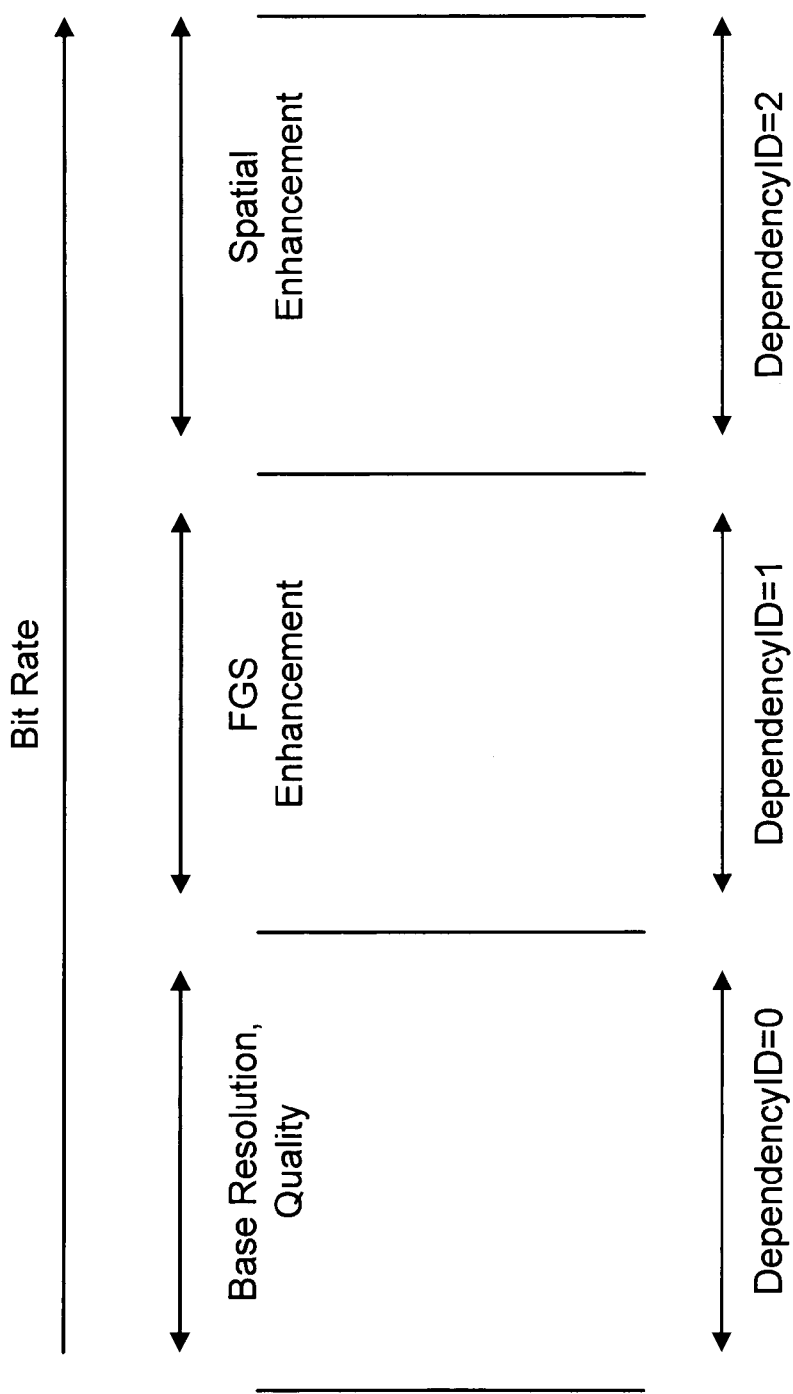
FIG. 5 is a generic representation of a bit rate stream including base resolution layers, FGS enhancement layers, and spatial enhancement layers according to the present invention.

One embodiment of the invention for decoding scalable video data is discussed below and is depicted in FIG. 5. In this particular embodiment, multiple layers are used. In this embodiment, there is at least one base resolution layer and at least one additional layer which is optionally coded relative to the base layer resolution layer. Additional layers that are coded relative to the base layer contain only FGS refinement/enhancement information, while still other layers include spatial enhancement information. Each additional layer that is coded relative to the base layer is also assigned an identifier (the DependencyID) that is drawn from a common sequence of numbers used to identify all enhancement layers. The base layer indicator in subsequent enhancement layers may be set to indicate either (1) a layer that contains only FGS enhancement information; or (2) a layer that contains no FGS enhancement information. Additionally, both types of enhancement layers may be present in the same bit stream. Unlike conventional systems, the DependencyID for the FGS enhancement layers is different than the DependencyID for the base resolution layer. To illustrate why this is important, a common intermediate format (CIF) 64 kbps sequence may be encoded relative to a quarter-CIF (QCIF) 64 kbps sequence, of which 48 kbps is the QCIF "base layer" and 16 kbps is FGS enhancement data. If the CIF sequence is subject to a bit rate constraint of 64 kbps, and the spatial enhancement layer is encoded relative to the "base+FGS" layers, then there is no bit rate available for spatial enhancement, since the "base+FGS" already consumes the full 64 kbps. On the other hand, if the spatial enhancement layer is only encoded relative to the "base" layer, then 16 kbps is still available for coding the spatial enhancement.

The following is a basic example showing how the present invention is implemented, A QCIF 48 kbps layer, which is the base quality layer, can have a DependencyID of 0, while having no BaseDependencyID (a base dependency identifier), which is used to indicate the corresponding base layer, because it is not relative to another layer. A QCIF 64 kbps layer (i.e., a 16 kbps FGS layer), can have a DependencyID of 1 and a BaseDependencyID of 0, meaning that it is encoded relative to the QCIF 48 kbps layer. A CIF 84 kbps layer (a spatial enhancement layer) can have a DependencyID of 2 and a BaseDependencyID of 0, meaning that it is also encoded relative to the QCIF 48 kbps layer. On the other hand, the CIF kbps 84 kbps layer could alternatively have a BaseDependencyID of 1, in which case it would be encoded relative to the QCIF 64 kbps layer. By the FGS enhancement layer having a different DependencyID than the base quality layer, the subsequent enhancement layers are able to be encoded relative to either the base layer or to a FGS enhancement layer.

Figure 4:
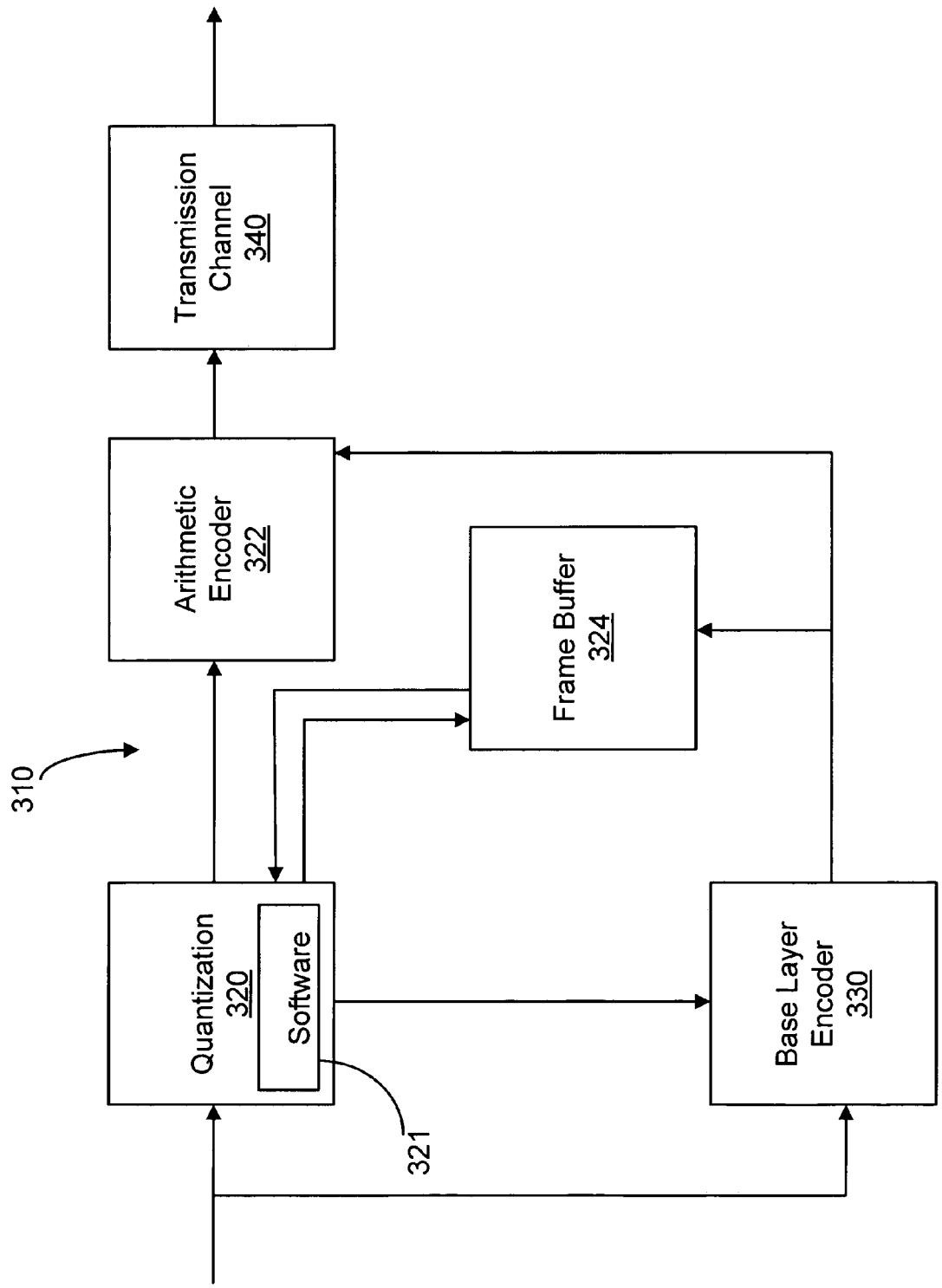
FIG. 4 is illustrates a video encoder employing the present invention.

FIG. 4 illustrates a video encoder 310 that encodes a scalable bit stream in accordance with the present invention. As shown, the video encoder 310 comprises a quantizer 320 to emit binary bits to an arithmetic coding block 322. The quantizer 320 receives original signals indicative of the original value of the coefficients and provides reconstructed values of the coefficients to a frame buffer block 324. The arithmetic coding block 322 submits encoded video data in a bit stream to a transmission channel 340. It is understood that the quantization procedure can be carried out by hardware or software in the quantizer 320. For example, the quantizer 320 may contain a software program 321 for carrying out quantization steps. Furthermore, the video encoder 310 may comprise a base layer encoder 330 operatively connected to the frame buffer block 324 and the arithmetic coding block 322 to carry out base layer encoding providing a signal indicative of base layer encoded data. The base layer encoder 330 as such is known in the art. The process depicted in FIG. 4 is repeated for each FGS layer. In other words, the FGS reconstruction of one layer (which is the output from the quantizer 320) becomes the output of the base layer encoder 320 in the next layer.

The present invention can be implemented directly in software using any common programming language, such as C/C++, or an assembly language. The present invention can also be implemented in hardware and used in a wide variety of consumer devices.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:

decoding, using a video decoding device, a base quality layer from a scalable video data bit stream;

decoding, using the video decoding device, at least one fine grain scalability enhancement layer from the bit stream, each of the at least one fine granularity scalability enhancement layer being coded directly or indirectly relative to the base quality layer, wherein the at least one fine grain scalability enhancement layer includes only fine grain scalability enhancement information and is associated with an identifier that is drawn from a predetermined sequence of numbers used to identify all enhancement layers and the base quality layer, and wherein the base quality layer and each of the at least one fine grain scalability enhancement layer are associated with different identifiers;

decoding a subsequent enhancement layer including a first base dependency identifier indicating that coding of the subsequent enhancement layer is performed relative to a layer that contains only fine grain scalability enhancement information; and decoding an additional subsequent enhancement layer including a second base dependency identifier indicating that coding of the additional subsequent enhancement layer is performed relative to a layer that contains no fine grain scalability enhancement information.

2. The method of claim 1, wherein the at least one fine grain scalability enhancement layer comprises progressive refinement slices in the scalable extension to the H.264/AVC video coding standard.

3. The method of claim 1, wherein the at least one fine grain scalability enhancement layer is also associated with a base dependency identifier indicating a layer relative to which the at least one fine grain scalability enhancement layer is directly coded, and wherein the layer may be either the base quality layer or another fine grain scalability layer.

4. A computer program product, embodied on a computer-readable medium, comprising:

computer code for decoding a base quality layer from a scalable video data bit stream;

computer code for decoding at least one fine grain scalability enhancement layer from the bit stream, each of the at least one fine granularity scalability enhancement layer being coded directly or indirectly relative to the base quality layer, wherein the at least one fine grain scalability enhancement layer includes only fine grain scalability enhancement information and is associated with an identifier that is drawn from a predetermined sequence of numbers used to identify all enhancement layers and the base quality layer, and wherein the base quality layer and each of the at least one fine grain scalability enhancement layer are associated with different identifiers; and computer code for decoding a subsequent enhancement layer including a first base dependency identifier indicating that coding of the subsequent enhancement layer is performed relative to a layer that contains only fine grain scalability enhancement information; and computer code for decoding an additional subsequent enhancement layer including a second base dependency identifier indicating that coding of the additional subsequent enhancement layer is performed relative to a layer that contains no fine grain scalability enhancement information.

5. The computer program product of claim 4, wherein the at least one fine grain scalability enhancement layer comprises progressive refinement slices in the scalable extension to the H.264/AVC video coding standard.

6. An apparatus, comprising:

at least one processor; and at least one memory including a computer program code, the at least one memory and the computer program code configured to, working with the at least one processor, cause the apparatus to:

decode a base quality layer from a scalable video data bit stream;

decode at least one fine grain scalability enhancement layer from the bit stream, each of the at least one fine granularity scalability enhancement layer being coded directly or indirectly relative to the base quality layer, wherein the at least one fine grain scalability enhancement layer includes only fine grain scalability enhancement information and is associated with an identifier that is drawn from a predetermined sequence of numbers used to identify all enhancement layers and the base quality layer, and wherein the base quality layer and each of the at least one fine grain scalability enhancement layer are associated with different identifiers;

decode a subsequent enhancement layer including a first base dependency identifier indicating that coding of the subsequent enhancement layer is performed relative to a layer that contains only fine grain scalability enhancement information; and decode an additional subsequent enhancement layer including a second base dependency identifier indicating that coding of the additional subsequent enhancement layer is performed relative to a layer that contains no fine grain scalability enhancement information.

7. The apparatus of claim 6, wherein the at least one fine grain scalability enhancement layer comprises progressive refinement slices in the scalable extension to the H.264/AVC video coding standard.

* * * * *